United States Patent
Yoo (10) Patent No.: US 11,734,785 B1
(45) Date of Patent: Aug. 22, 2023

(54) SYSTEMS AND METHODS FOR SECURE WATERMARKING OF POINT CLOUDS

(71) Applicant: Illuscio, Inc., Culver City, CA (US)

(72) Inventor: Nolan Taeksang Yoo, Seattle, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/310,665

(22) Filed: May 2, 2023

(51) Int. Cl.
  *G06T 1/00* (2006.01)

(52) U.S. Cl.
  CPC .......... *G06T 1/0092* (2013.01); *G06T 1/0085* (2013.01)

(58) Field of Classification Search
  CPC ......... G06T 15/04; G06T 15/00; G06F 18/00; G06F 30/00
  See application file for complete search history.

(56) References Cited

U.S. PATENT DOCUMENTS

| | | | | |
|---|---|---|---|---|
| 6,452,594 B1 * | 9/2002 | Kamen | ................... | G06T 15/04 345/506 |
| 6,587,944 B2 * | 7/2003 | Yeung | ................... | G06T 1/0042 713/176 |
| 6,590,996 B1 * | 7/2003 | Reed | ................... | H04N 1/32352 348/460 |
| 8,401,223 B2 * | 3/2013 | Abeloe | ................... | G06T 7/50 348/42 |
| 9,031,277 B2 * | 5/2015 | Abeloe | ................ | H04N 13/172 382/100 |
| 9,563,970 B2 * | 2/2017 | Davis | ................... | G06T 11/00 |

* cited by examiner

*Primary Examiner* — Yosef Kassa
(74) *Attorney, Agent, or Firm* — Ansari Katiraei LLP; Arman Katiraei; Sadiq Ansari (57) ABSTRACT

Disclosed is a security controller for a content distribution system that generates and encodes point clouds with invisible, visually undetectable, and/or tamperproof watermarks. The controller selects a set of data points from the point cloud, and changes at least one specific bit of a set of bits that define a value for a particular non-positional element of the set of data points. The controller encodes point cloud with a first watermark that is unique to a requesting client based on the changing of the at least one specific bit. The controller distributes the file encoded with the first watermark to the requesting client and tracks the set of data points that were encoded with the first watermark in order to subsequently verify that the requesting client was the original recipient of the point cloud encoded with the first watermark.

20 Claims, 8 Drawing Sheets

SYSTEMS AND METHODS FOR SECURE WATERMARKING OF POINT CLOUDS

BACKGROUND

A watermark is added to a file to track the original recipient of the file and/or a specific distributed copy of the file. If the watermarked file is found with unauthorized users, the watermark may be used to track where and from whom the file was redistributed.

The watermark is typically a graphic, text, or other visual representation that is superimposed onto a visualization that is generated from the file data. For instance, the file may correspond to an image or a video, and the watermark may include text that is superimposed onto the image or video frames.

Visual watermarks may be removed or modified using various tools. The removal or modification of a visual watermark defeats the tracking and security purposes of watermarking a file.

DETAILED DESCRIPTION OF PREFERRED EMBODIMENTS

The following detailed description refers to the accompanying drawings. The same reference numbers in different drawings may identify the same or similar elements.

Provided are systems and methods for secure watermarking of point clouds. The secure watermarking includes inserting an invisible and/or visually undetectable watermark into the data points of a point cloud. The secure watermarking is tamper-proof because it is intermixed with the point cloud data in a manner that does not noticeably alter the visualization of the point cloud data and in a manner that prevents third-parties from identifying which point cloud data points contain the watermark.

The secure watermarking is performed by a security controller of a point cloud publishing and/or content distribution system. The security controller may generate a new watermark for a point cloud each time the point cloud is distributed to and/or accessed by a different client. The different watermarks are used to track each original recipient of the point cloud and/or a timestamp associated with each point cloud access. Accordingly, the watermarks may be used to track the unauthorized redistribution of a point cloud with a particular watermark back to the original recipient that received that point cloud with the particular watermark and/or the device that received that point cloud at the time recorded by the particular watermark.

For each new watermark, the security controller selects a different set of the point cloud data points to encode with the watermark. Encoding the selected set of data points with the watermark includes changing a specific bit of a specific non-positional element (e.g., the least significant bit of the color values) of the selected set of data points.

The encoding of the watermark to a least significant bit in one or more of the non-positional elements of the selected set of data points creates an insignificant and unnoticeable change to the visualization of the point cloud and/or the selected set of data points. Moreover, since only the security controller knows the bits that were changed, a client receiving the watermarked point cloud cannot remove or modify the watermark.

In other words, the watermark is stored as part of the original color values or other non-positional elements of the point cloud data points. There is no manner of differentiating the watermark from other point cloud data when the client only has access to the watermarked point cloud and/or other watermarked point clouds that may have been distributed to other clients with each watermark being stored to different sets of data points of the point clouds.

In some embodiments, the security controller stores a watermark certificate for each point cloud that is watermarked and distributed to different client or devices. The security controller uses the watermark certificates to store the date and time when each watermarked point cloud was distributed to one or more specific clients. The security controller also uses the watermark certificates to identify the different sets of points that were changed and that represent the different watermarks in the watermarked copies of the point cloud distributed to the specific clients. Accordingly, the security controller may use the watermark certificates to identify the date and time of distribution and the original recipient of a point cloud that contained a particular watermark and/or to track the distribution of that point cloud back to the original recipient.

Figure 1:
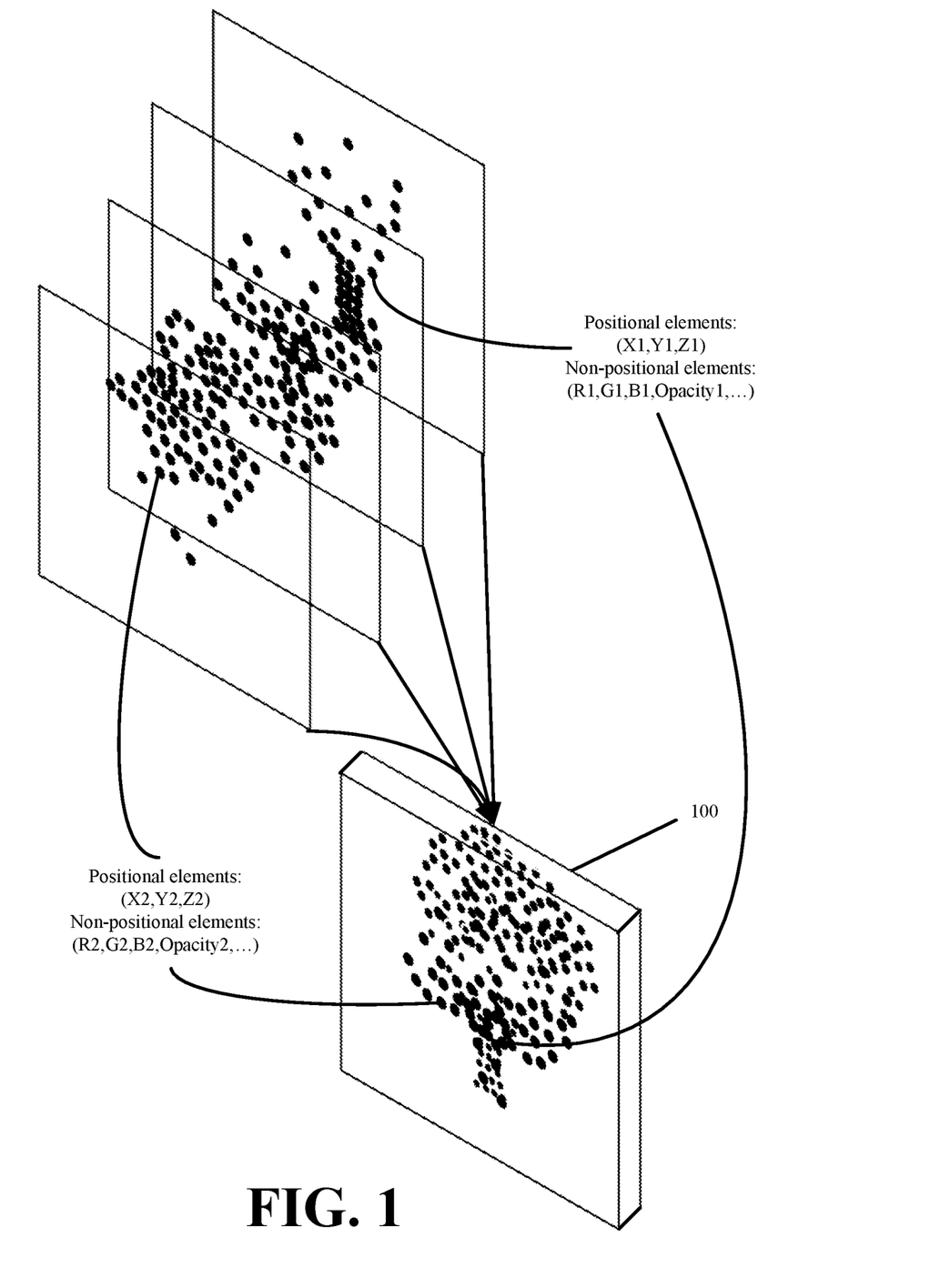
FIG. 1 illustrates an example point cloud in accordance with some embodiments presented herein.

FIG. 1 illustrates an example point cloud 100 in accordance with some embodiments presented herein. Point cloud 100 is defined with a set of data points that collectively form a three-dimensional ("3D") model of an environment or object.

The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the position of the point cloud data points are defined in a 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image has pixel data for each pixel of a defined resolution (e.g., 640×480, 800×600, etc.).

Each point cloud data point is defined with a plurality of elements. The plurality of elements includes a first set of positional elements and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud data point includes x-coordinate, y-coordinate, and z-coordinate elements to capture the position of a corresponding physical point from a surface or feature of the modeled environment or object. The positional elements further include a surface normal. The surface normal defines the angle, direction, or orientation that the surface or feature represented by the data point faces or is exposed to. More specifically, the surface normal is a line, ray, or vector that is perpendicular to the scanned surface, or feature represented by the data point. In some embodiments, the positional elements may be defined for created data points.

The non-positional elements include information about the detected characteristics of the surface or feature at a corresponding position in the scanned scene. The characteristics may correspond to a detected color. The color may be represented using red, green, blue ("RGB"), and/or other color component values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface or feature. In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic". These material properties may be associated with different values for the chrominance, hardness, translucence, reflectivity, luminance, and/or other visual characteristics of the data point defined with a material property.

Each point cloud data point of the point cloud includes an array of elements. The array of elements may provide the positioning of the data point in 3D space (e.g., positional element) as well as one or more characteristics (e.g., non-positional elements) of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Figure 2:
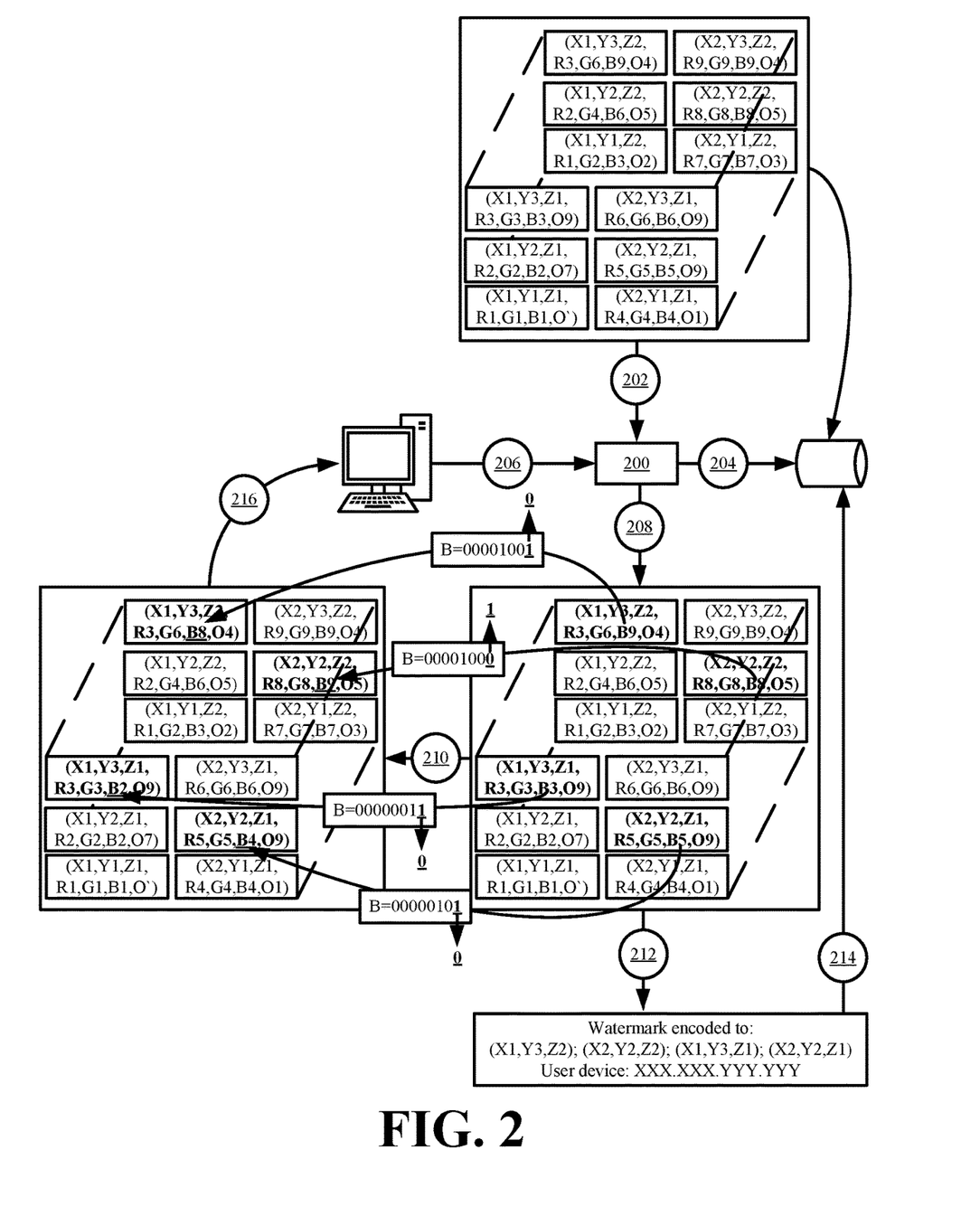
FIG. 2 illustrates an example of securely watermarking a point cloud in accordance with some embodiments presented herein.

FIG. 2 illustrates an example of securely watermarking a point cloud in accordance with some embodiments presented herein. Security controller 200 receives (at 202) a file that encodes a point cloud. The file stores the data for the positional elements and the non-positional elements of the data points that make up the point cloud. For instance, as shown in FIG. 2, the data points are defined with x, y, z positional values, and non-positional values for RGB color components and an opacity. Although not shown, the data points may be defined with other or different non-positional elements that further affect the visual representation of the data points. The data points collectively form a 3D object, environment, image, or animation.

The point cloud may include secure or confidential 3D assets that are created for a video game, movie, or other content. The secure watermarking is used to prevent the point cloud and the represented 3D assets from being accessed by unauthorized client devices and users, and/or to track an authorized client device or user that may have intentionally or unintentionally provided access to an unauthorized client device and user.

Security controller 200 stores (at 204) an original copy of the point cloud. The original copy is used to verify and track the entities that receive different watermarked copies of the point cloud. Specifically, security controller 200 stores the data contained within the positional elements and the non-positional elements of the point cloud in a local database, repository, or other non-transitory storage medium.

Security controller 200 receives (at 206) a request to access the point cloud. For instance, security controller 200 receives (at 202) the file from the point cloud creator or a publisher that makes the point cloud available for secure distribution to authorized client devices or users. The request to access the point cloud may come from an authorized client device or user in the form of a HyperText Transfer Protocol ("HTTP") GET request message that is issued over a data network.

In some embodiments, security controller 200 verifies that the requesting client device or user is authorized to access the requested point cloud before generating and distributing a unique watermarked instance of the point cloud to the requesting client device or user. In some other embodiments, security controller 200 generates and distributes a unique watermarked instance of the point cloud to requesting client devices or users without verifying or authorizing client device or user access to the point cloud.

Security controller 200 dynamically selects (at 208) a set of the point cloud data points to encode with the secure watermark. Security controller 200 selects (at 208) a different set of data points to encode each new watermark for tracking the distribution of the same point cloud to a new or different authorized client device and/or user.

In some embodiments, security controller 200 dynamically selects (at 208) the set of data points based on a unique identifier associated with the requesting client device or user. The unique identifier may include one or more of a network address, port number, user agent, and/or other unique signature of the client device submitting the request to access the point cloud. The unique identifier may be defined from login information provided by an authorized user or a security token that security controller 200 issues to an authorized client device. Security controller 200 may hash the unique identifier, and may use the hash value to determine which of the data points to select (at 208).

In some other embodiments, security controller 200 dynamically selects (at 208) the set of data points based on a random or a formulaic selection that changes after each request. For instance, security controller 200 selects to encode a first watermark in every data point with a first x-coordinate position in response to a first request to access the point cloud, and selects to encode a second watermark in every data point with a second x-coordinate position in response to a second request to access the point cloud.

In any case, the dynamic selection (at 208) changes with every new request for the point cloud by a different authorized client device or user, wherein the new request involves creating a new watermark to track distribution of the point cloud to a new or different recipient. The dynamically selected (at 208) set of data points includes two or more consecutive or non-consecutive of the point cloud data points. In other words, the set of data points may include data points that are not directly adjacent to one another in the 3D space of the point cloud.

Security controller 200 encodes (at 210) the watermark in the dynamically selected (at 208) set of data points by changing or flipping the least significant bit for one or more of the non-positional elements of each data point from the dynamically selected (at 208) set of data points. For example, the RGB color values of each data point may be stored as a 48-bit non-positional element. In this example, encoding (at 210) the watermark may include changing the least significant bit of the 48-bit data point color definition.

The change to the least significant bit creates an unnoticeable change in the RGB color values of the selected (at 208) set of data points and/or in the visualization of the selected (at 208) set of data points. The created difference in the least significant bit of the RGB color values of the dynamically selected (at 208) set of data points in the watermarked point cloud and the least significant bit of the RGB color values of the same set of data points in the original point cloud becomes the watermark that identifies which client device or user received this particular watermarked instance of the point cloud.

In some embodiments, encoding (at 210) the watermark includes flipping the least significant bit in another or different non-positional element of the dynamically selected (at 208) set of data points. For instance, rather than change the least significant bit in the RGB color values of the data points, security controller 200 may change the least significant bit in an 8-bit reflectivity non-positional element, a 4-bit transparent non-positional element, and/or other non-positional elements that again results in an unnoticeable change in the visual quality or visualization of the dynamically selected (at 208) set of data points.

In some embodiments, security controller 200 changes which non-positional element least significant bit is changed when encoding (at 210) different watermarks for different requested access to the point cloud. For instance, security controller 200 may encode (at 210) a first watermark to the least significant bit representing the RGB color values of the dynamically selected (at 208) set of data points, and may encode (at 210) a second watermark to the least significant fit representing the reflectivity value of the dynamically selected (at 208) set of data points.

In still some other embodiments, security controller 200 changes which bit of a specific non-positional element is changed to encode the watermark. For instance, rather than flip the least significant bit in the RGB color values of the dynamically selected (at 208) set of data points, security controller may flip the second least significant bit or another bit in the RGB color values.

Security controller 200 generates (at 212) a watermark certificate that tracks the dynamically selected (at 208) set of data points that are encoded (at 210) with the watermark, the client device or user that is to receive that particular watermarked instance of the point cloud (e.g., the point cloud with a unique watermark encoded (at 210) to the dynamically selected (at 208) set of data points), and/or the date and time when the particular watermarked point cloud is distributed to or accessed by the client device or user. The watermark certificate may include one or more identifiers that uniquely identify or differentiate each of the dynamically selected (at 208) set of data points from other data points of the point cloud that are not encoded with the watermark. The watermark certificate may also identify the least significant bit of which non-positional element was changed when the encoding (at 210) involves changing the least significant bit of different non-positional elements. The watermark certificate may also store the Internet Protocol ("IP") address, Media Access Control ("MAC") address, login credentials, and/or other unique signature of the client device or user that requests and receives access to the point cloud with the watermark encoded to the dynamically selected (at 208) set of data points.

Security controller 200 stores (at 214) the watermark certificate with the original copy of the point cloud, and distributes (at 216) the watermarked point cloud to the requesting client device or user in response to the request to access the point cloud. Distributing (at 206) the watermarked point cloud includes transmitting the point cloud with the dynamically selected (at 208) set of data points having the modified least significant bit as a set of data packets to the requesting client device.

Without having access to the watermark certificate and/or the original unwatermarked point cloud, a receiving entity has no means of detecting and/or differentiating the watermark from the point cloud data. The encoded (at 210) watermark does not noticeably change the visualization of the point cloud, and exists separate from any visual watermark that may also be added to the point cloud. Accordingly, changing the visual watermark would not affect the watermark that is encoded (at 210) in the least significant bit of the non-positional elements of the dynamically selected (at 208) set of data points. Even with access to the original unwatermarked point cloud and a particular watermarked instance of the point cloud, the receiving entity may be unable to determine if the changed least significant bits represent a changed or edited instance of the point cloud or represent a watermark used to track the recipient of the point cloud.

Figure 3:
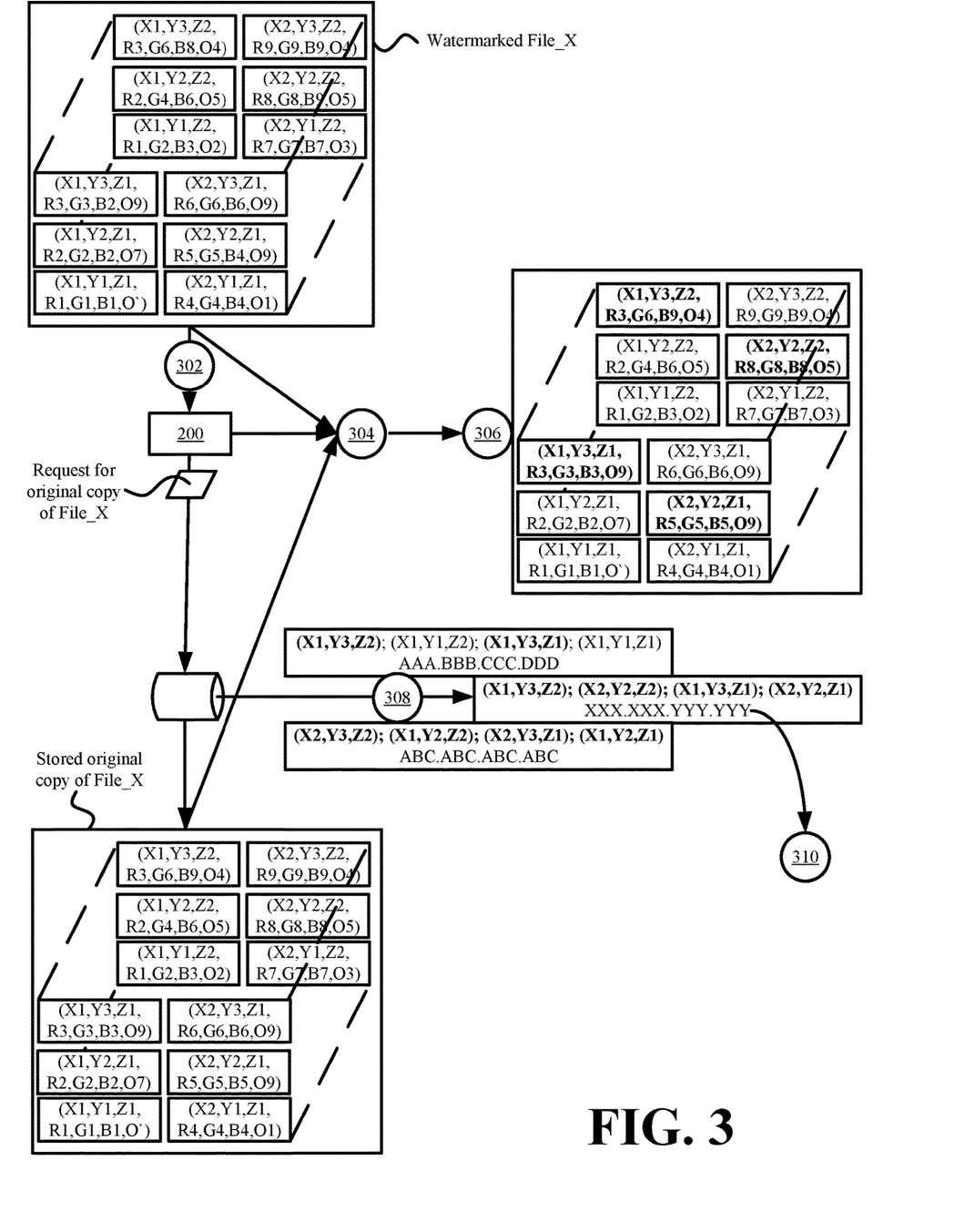
FIG. 3 illustrates an example of verifying the recipient associated with a watermarked point cloud in accordance with some embodiments presented herein.

FIG. 3 illustrates an example of security controller 200 verifying the recipient associated with a watermarked point cloud in accordance with some embodiments presented herein. Security controller 200 detects (at 302) a watermarked point cloud being used by an unauthorized third party. For instance, the unauthorized third party makes the watermarked point cloud available for redistribution or has used the watermarked point cloud in a 3D environment, 3D experience, or other content. As a specific example, the watermarked point cloud may include a 3D character created by an artist for licensed use in first and second 3D games or by first and second publishers. However, the same 3D character is found in a third 3D game or is being used by a third publisher. Accordingly, security controller 200 may use the watermark to determine which of the games or publishers the watermarked point cloud was obtained from.

Security controller 200 compares (at 304) a copy of the watermarked point cloud against the original copy of the point cloud stored by security controller 200. From the comparison (at 304), security controller 200 determines (at 306) which of the data points in the watermarked point cloud had the least significant bit in one or more of the non-positional elements changed.

Security controller 200 selects (at 308) the stored watermark certificate that identifies the same set of data points or a threshold percentage (e.g., 90%) of the same set of data points having the least significant bit in the same one or more non-positional elements being changed. In some embodiments, the watermark certificate stores the positional elements or x, y, and z coordinates for the data points with the changed bit in the one or more non-positional elements, and the positional elements or x, y, and z coordinates are used to match the watermark certificate to the set of data points that encode the watermark in the watermarked point cloud.

Security controller 200 extracts (at 310) the client device identifier or user identifier that is stored as part of the selected (at 308) watermark certificate to identify the client device or user that originally received the watermarked point cloud. In other words, security controller 200 tracks the original recipient of the watermarked point cloud using the client device identifier or user identifier information from the watermark certificate that identifies the same set of data points from the watermarked point cloud that are encoded with the watermark. Security controller 200 may also extract (at 310) the date and time that the client device or user received the watermarked point cloud to allow for tracking in terms of a timeframe.

In some embodiments, the watermarked point clouds are files whose contents may be changed. For instance, users may edit the positional and/or non-positional elements of one or more data points from a watermarked point cloud, may add new data points to the watermarked point cloud, or may remove data points from the watermarked point cloud. To avoid corrupting or changing the watermark after editing the point cloud data points, security controller 200 may encode the watermark into nodes of a tree-based representation of the point cloud.

Figure 4:
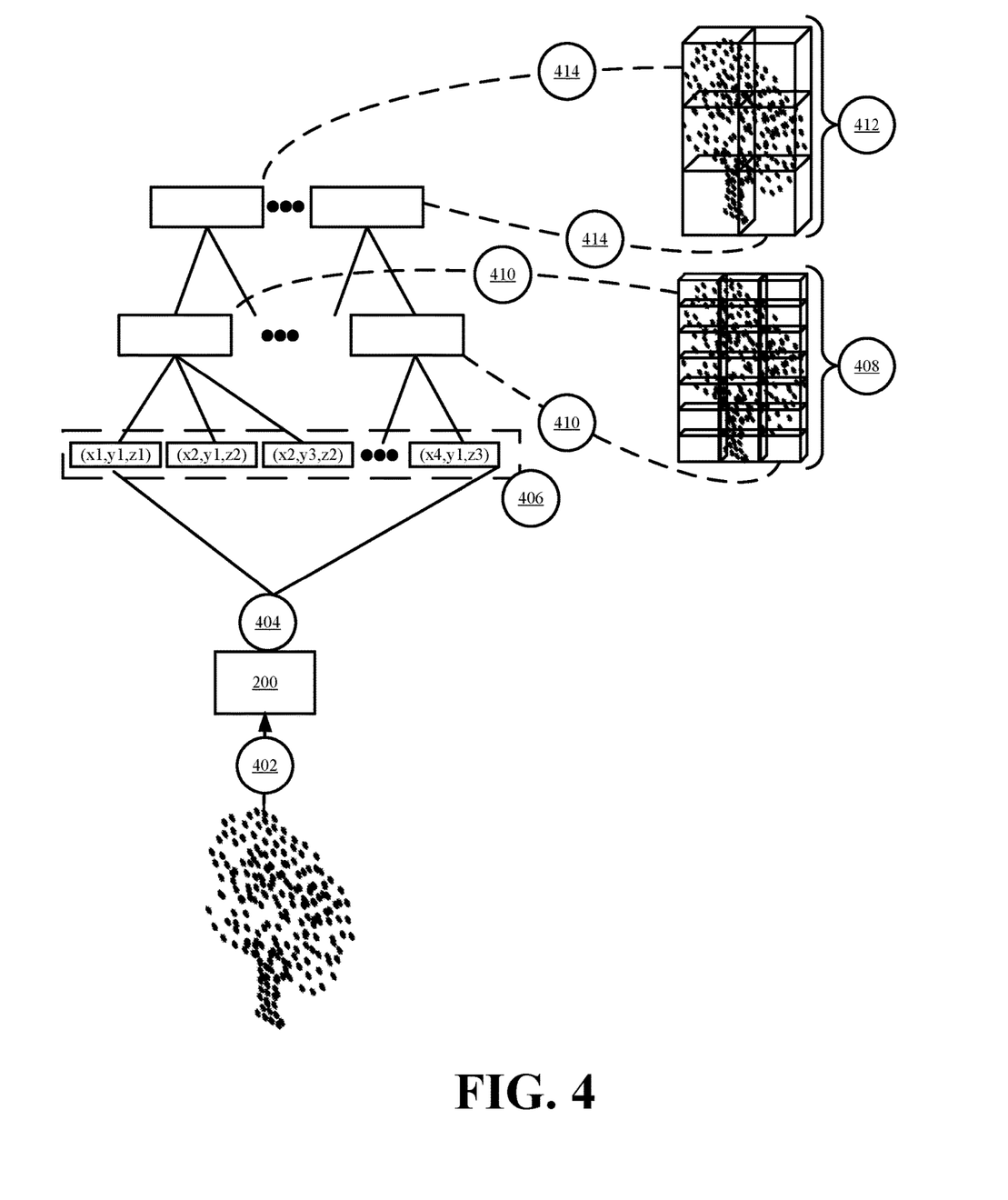
FIG. 4 illustrates an example of generating a tree-based representation of a point cloud in accordance with some embodiments presented herein.

FIG. 4 illustrates an example of generating a tree-based representation of a point cloud in accordance with some embodiments presented herein. Security controller 200 obtains (at 402) the data points that are stored within a point cloud file. Security controller 200 organizes (at 404) the point cloud data points based on their positional values. For instance, security controller 200 sorts the data points starting with increasing x-coordinate positions to increasing y-coordinate positions to increasing z-coordinate positions.

Security controller 200 defines (at 406) the leaf nodes of the tree-based representation according to the organization of the point cloud data points. Each leaf node may represent or correspond to a different data point of the point cloud. In some embodiments, each leaf node may include a pointer to a data point. For instance, the positional elements of each data point may be stored as a pointer to the corresponding data point in the point cloud. In some other embodiments, each leaf node may store the values for all positional and non-positional elements of a different point cloud data point. In some embodiments, each leaf node may also be associated with unique node identifier. Accordingly, the unique node identifier identifies a specific node of the tree-based representation that links to a specific data point of the point cloud. Even if the positional and/or non-positional elements of that specific data point change or if data points are added to or deleted from the point cloud, the same node identifier is used to select the node that links to that specific data point.

In some embodiments, security controller generates and assigns the node identifiers sequentially to the nodes of the tree-based representation.

Security controller 200 adds parent nodes for the volume or region of space spanned by two or more leaf nodes of the tree. For instance, security controller 200 partitions (at 408) the space that is spanned by the point cloud data points into equal sized cubes or other volumes of a first size, creates (at 410) a parent node for each cube or volume of the first size, and links a parent node to one or more leaf nodes based on the positional values for the data points of the one or more leaf nodes falling within the region or volume of space represented by the parent node. If a parent node corresponds to an empty region of space (e.g., no data points within the cube or volume represented by the parent node), security controller 200 may cull or remove that parent node from the tree or may insert the parent node as an indicator for a region of empty space.

Security controller 200 may continue constructing (at 412 and 414) the tree with higher levels of nodes (e.g., grandparent nodes) that represent cubes or other volumes of a size that is larger than the size of the lower-level nodes. Security controller 200 may continue until the definition of a root node that encompasses the space spanned by the point cloud.

Security controller 200 may attribute non-positional information to a parent node based on the non-positional information of its children nodes. For instance, the RGB values for a parent node may be the average, mean, median, or other value computed or selected from the children node RGB values. Alternatively, the RGB values for a parent node may be defined as the maximum and minimum RGB values of the children nodes, or as a range of RGB values spanned by the RGB values of the children nodes. Accordingly, the definition of the parent node positional and non-positional values may be a lossy process.

In some embodiments, security controller 200 may generate the root node first, wherein the root node represents the particular region of 3D space spanned by all data points of the point cloud. In constructing a binary tree, security controller 200 may partition the particular region of 3D space into two equal sized cubes or volumes, may define children nodes under the root node for each cube or volume, and may continue subdividing the particular region of 3D space in this manner until the leaf nodes corresponding to the individual data points are reached. In constructing an octree, security controller 200 may partition the particular region of 3D space into eight equal sized cubes volumes, may define children nodes under the root node for each cube or volume, and may continue subdividing the particular region of 3D space in this manner until the leaf nodes corresponding to the individual data points are reached.

To optimize the tree construction and reduce the potential for empty nodes in the tree, security controller 200 may construct a k-dimensional tree and may partition the particular region of 3D space spanned by a set of data points into two or more equal or unequal sized volumes. The size and/or shape of each volume may be determined by the number of data points, parent nodes, or children nodes that fall within that volume. For instance, security controller 200 may expand the size of a volume when the volume corresponds to empty space or encompasses fewer than one child node or one data point.

Although FIG. 4 illustrates an example of generating a first tree-based representation of a point cloud from the positional elements of the point cloud data points, security controller 200 may generate other tree-based representations for the same point cloud based on one or more other positional or non-positional elements of the point cloud data points. For instance, security controller 200 may generate a second tree-based representation for the point cloud that organizes the point cloud data points based on values for chrominance and luminance non-positional elements of the point cloud data points. Security controller 200 may reference the first tree-based representation when editing the positioning of a set of data points, and may reference the second tree-based representation when adjusting the lighting for a visualization or image that is rendered from the point cloud data points.

Figure 5:
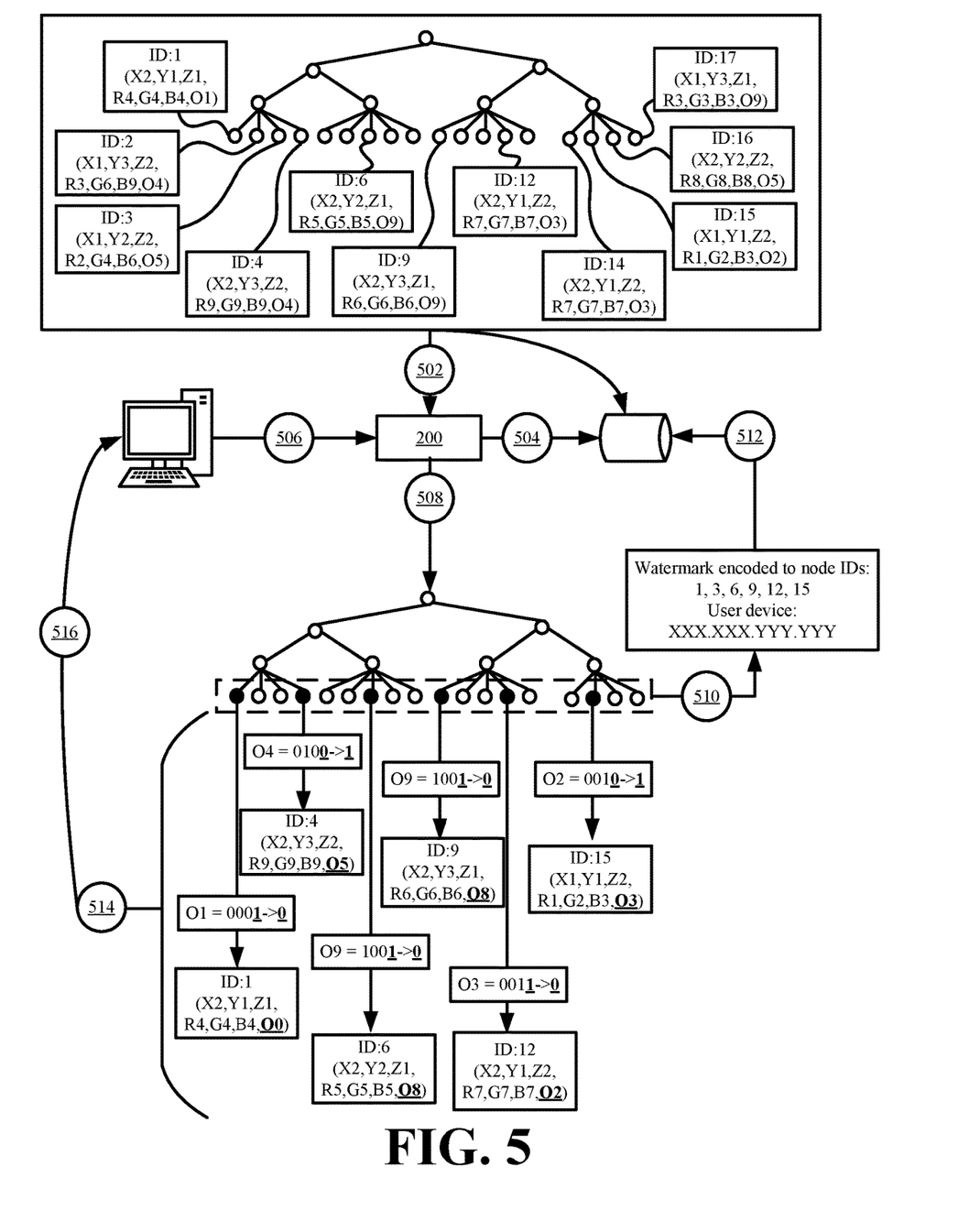
FIG. 5 illustrates an example of encoding a watermark in a point cloud using nodes from a tree-based representation of the point cloud in accordance with some embodiments presented herein.

Security controller 200 may be configured to generate any of a binary tree, octree, k-dimensional tree, or other tree-based representations for a point cloud, and may encode the unique watermarks for different downloads or accesses of the point cloud into different nodes of the tree-based representation. FIG. 5 illustrates an example of encoding a watermark in a point cloud using nodes from a tree-based representation of the point cloud in accordance with some embodiments presented herein.

Security controller 200 receives (at 502) a tree-based representation of the point cloud. In some embodiments, the tree-based representation stores all the point cloud data. In some other embodiments, security controller 200 receives a file that is defined with data points distributed in a 3D space. In some such embodiments, security controller 200 generates the tree-based representation based on the data point data of the file. Security controller 200 stores (at 504) the tree-based representation of the point cloud.

Security controller 200 also receives (at 506) a request to access the point cloud from a particular client device. Based on identifying information associated with the particular client device, identifying information of the user associated with the particular client device, the number of times the point cloud has been accessed, and/or a randomized salt value, security controller 200 dynamically selects (at 508) a set of nodes from the tree-based representation to encode with a watermark. The set of nodes may include different leaf nodes from the tree-based representation or different combinations of nodes from different tiers or levels of the tree-based representation.

The node identifiers of the dynamically selected (at 508) set of nodes do not change even as the point cloud is edited or new data points are added to the point cloud and represented with new nodes that are attached to the tree-based representation. In other words, a particular node identifier identifies a particular node of the tree-based representation. The particular node links to or is associated with a particular data point of the point cloud. Edits applied to the point cloud may change the positional or non-positional elements of the particular data point, and may cause the particular node to be moved under different parent nodes or different branches of the tree-based representation. In any case, the particular node persists in the tree-based representation, remains linked to the particular data point, and retains the same particular node identifier even if the particular data point is removed from the point cloud or is edited to have different values. In some embodiments, when the non-positional elements of a data point change, a new node may be created in the tree-based representation to link the data point with the changed non-positional elements, and a previously existing node may link to the same data point with the original non-positional element values. For instance, when a set of data points are edited, a previous branch of nodes that represents that the set of data points with the original non-positional values may be moved to an inactive segment of the tree-based representation and a new branch of nodes that represents the set of data points with the edited non-positional values may be added to an active segment of the tree-based representation.

Accordingly, security controller 200 enters (at 510) the identifier for each node of the dynamically selected (at 508) set of nodes to a watermark certificate that is generated for the new watermark of the point cloud. Security controller 200 also enters (at 510) a unique identifier of the particular client device or the user associated with the particular client device to the watermark certificate.

Security controller 200 stores (at 512) the watermark certificate with the original tree-based representation of the point cloud in a secure storage medium. For instance, the watermark certificates are stored as files or records in a database or other repository of the point cloud publishing and/or content distribution system.

Security controller 200 changes (at 514) a least significant bit for a particular non-positional element that is associated with each node of the dynamically selected (at 508) set of nodes. In some embodiments, the set of nodes store original values that were defined for the positional and non-positional elements of the data points linked to or represented by the set of nodes in the tree-based representation. As noted above, when the data point values change and the point cloud is saved with the new data point values, new nodes may be added to the tree-based representation with the updated values. The new nodes may be linked to the original nodes, thereby creating a stored history of the values associated with the data point values. However, the original values stored with the set of nodes remain unchanged which preserves the watermark that is encoded by changing (at 514) the least significant bit for the particular non-positional element that is associated with each node of the dynamically selected (at 508) set of nodes.

Security controller 200 distributes (at 516) the watermarked tree-based representation with or without the point cloud to the particular client device. The watermarked tree-based representation has the least significant bit for the non-positional element that is associated with each node of the dynamically selected (at 508) set of nodes changed while the least significant bit for the non-positional element associated with all other nodes is unmodified from the original values of the original tree-based representation.

Figure 6:
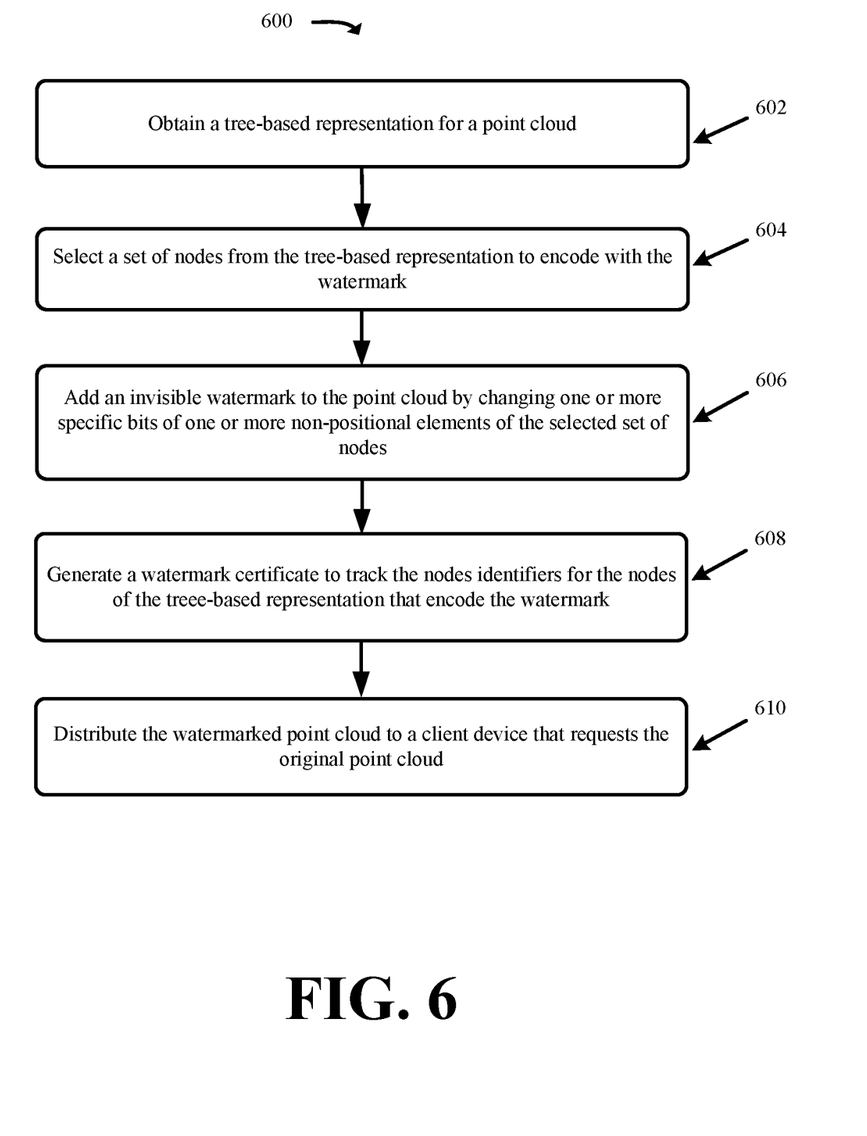
FIG. 6 presents a process for encoding a watermark in a tree-based representation of a point cloud in accordance with some embodiments presented herein.

FIG. 6 presents a process 600 for encoding a watermark in a tree-based representation of a point cloud in accordance with some embodiments presented herein. Process 600 is implemented by security controller 200. Security controller 200 is part of a point cloud publishing and/or content distribution system that includes one or more devices or machines with processor, memory, storage, network, and/or other hardware resources for the storage and secure distribution of point cloud files. Security controller 200 is the system component that generates the point cloud watermarks and that verifies the original recipient of a watermarked point cloud.

Process 600 includes obtaining (at 602) a binary tree, octree, or other tree-based representation for a point cloud. In some embodiments, security controller 200 generates the tree-based representation from data points of a point cloud. In some other embodiments, the point cloud is defined as the tree-based representation.

The tree-based representation includes a hierarchical arrangement of nodes that are directly or indirectly connected to a root node. The root node represents the entirety of the point cloud, and may be traversed to access any node for any region of space in the point cloud or for any data point of the point cloud. Each node under the root node represents a smaller region of space with a subset of the point cloud data points. Each leaf node represents an individual point cloud data point. Each node is defined with a unique node identifier.

Process 600 includes selecting (at 604) a set of nodes from the tree-based representation to encode with the watermark. Security controller 200 may select different sets of nodes for each watermark encoding of the point cloud. The set of nodes may include different combination of leaf nodes or different combinations of nodes from different levels or tiers of the tree-based representation.

In some embodiments, security controller 200 selects (at 604) the set of nodes based on a unique identifier associated with a device or user that request access to the point cloud. For instance, security controller 200 may be configured with a node selection algorithm that changes based on the device or user identifier. The device or user identifier may be hashed to produce a fixed-range value that modifies which nodes are selected for the watermark encoding.

In some other embodiments, security controller 200 selects (at 604) a random set of nodes. For instance, security controller 200 may generate a random value for the node selection algorithm.

Alternatively, security controller 200 may iterate through different selection sequences. For instance, security controller 200 may be configured to select every hundredth data point of the point cloud, and may begin the selection from a first node for a first watermark of the point cloud, a second node for a second watermark of the point cloud, and so on, thereby leading to 100 different watermarks for 100 different access requests of the point cloud by different devices or different users.

Process 600 includes adding (at 606) an invisible watermark to the point cloud by changing one or more specific bits of one or more non-positional elements of the selected (at 604) set of nodes. In some embodiments, security controller 200 changes the least significant bit of the same non-positional element (e.g., color elements). In some other embodiments, security controller 200 changes other bits (e.g., the second least significant bit, the most significant bit, etc.) of the same non-positional element. In still some other embodiments, security controller 200 is configured to change which bit on which non-positional element it changes in order to define the watermark. For instance, security controller may change the least significant bit of the RGB non-positional element on a first set of nodes of a particular point cloud when generating a first watermark for the particular point cloud in response to an access request from a first device, and may change the second least significant bit of the opacity non-positional element on a second set of nodes of the particular point cloud when generating a second watermark for the particular point cloud in response to a second access request from an access request from a different second device.

Process 600 includes generating (at 608) a watermark certificate to track the nodes that encode the watermark. The watermark certificate may be a file or data structure. The watermark certificate stores the node identifiers for each node from the selected (at 604) set of nodes of the tree-based representation that is used to store the watermark, an identifier of the client device or associated user that requested access to the watermarked point cloud, and/or identifiers for the specific bit or bits and/or non-positional elements that were used to define the watermark. The identification of the specific bit or bits and/or non-positional elements in the watermark certificate may be optional when these positions and elements are static and do not change for different watermarks.

Process 600 includes storing (at 610) the tree-based representation of the point cloud with the watermark certificate. The tree-based representation may be stored (at 610) with multiple different watermark certificates, and may be used as reference data to verify the original recipient of a watermarked point cloud. Security controller 200 stores (at 610) the tree-based representations, original point clouds, and watermark certificates in a database or repository.

Process 600 includes distributing (at 612) the watermarked point cloud to a client device that requests the original point cloud. The watermarked point cloud is or includes the tree-based representation with the one or more specific bits of one or more non-positional elements of the selected (at 604) set of nodes having been flipped or changed. Distributing (at 612) the watermarked point cloud includes streaming or otherwise transmitting the watermarked tree-based representation as data packets over a data network, or transferring the watermarked tree-based representation from one storage medium to another.

Figure 7:
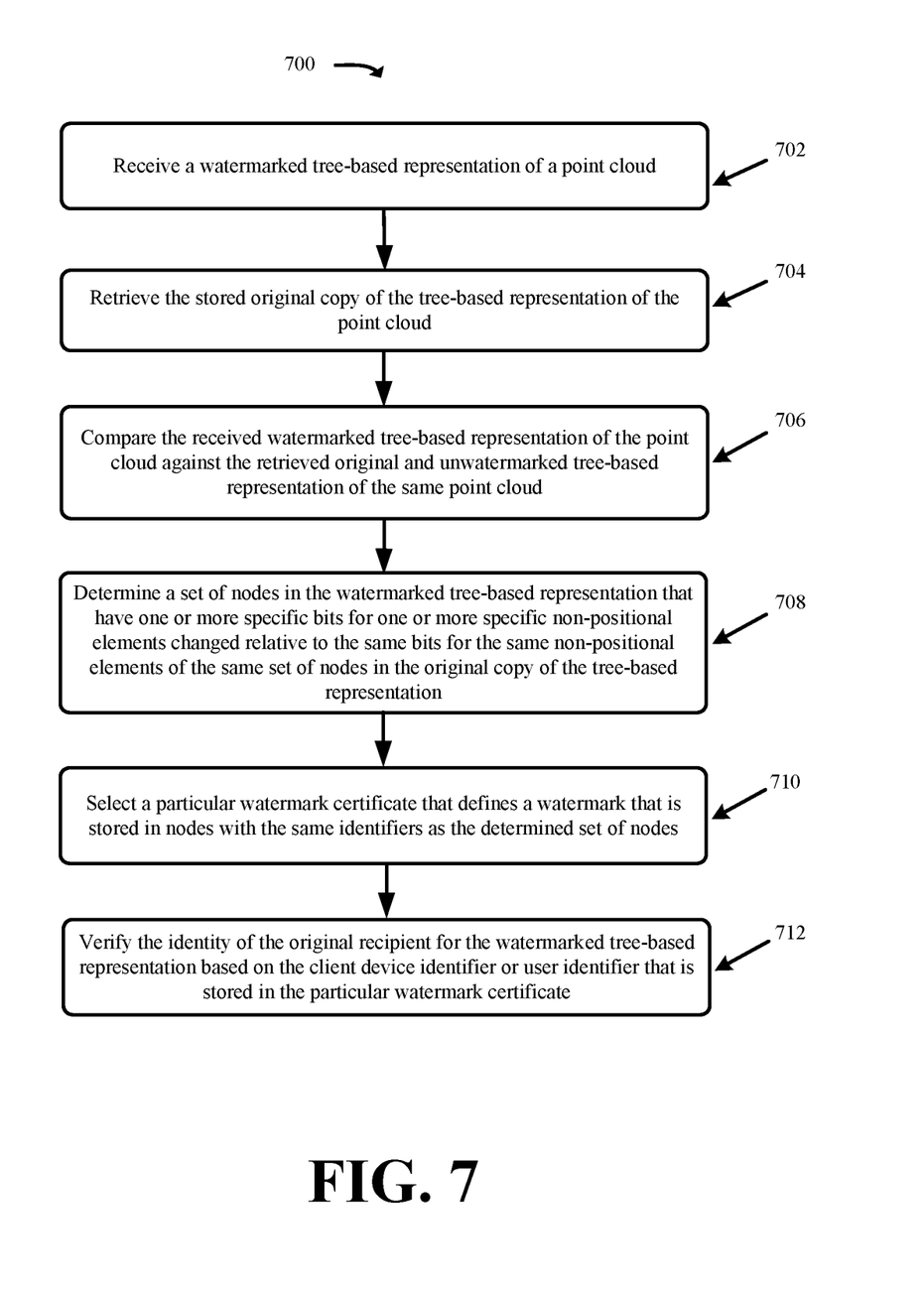
FIG. 7 presents a process for verifying a watermarked tree-based representation of a point cloud in accordance with some embodiments presented herein.

FIG. 7 presents a process 700 for verifying a watermarked tree-based representation of a point cloud in accordance with some embodiments presented herein. Process 700 is implemented by security controller 200.

Process 700 includes receiving (at 702) a watermarked tree-based representation of a point cloud that is subject to verification. For instance, a point cloud creator or security controller 200 may detect a use of the point cloud on a site or content of an unauthorized entity. Security controller 200 downloads or obtains a copy of the tree-based representation from that site or content.

Process 700 includes retrieving (at 704) the stored original copy of the tree-based representation of the point cloud. Security controller 200 may identify the name of the received (at 702) watermarked tree-based representation, and may retrieve (at 704) the stored unwatermarked or original copy of the same file or tree-based representation. In some embodiments, security controller 200 uses other identifiers besides the filename to retrieve (at 704) the original copy. For instance, the file metadata or embedded signatures may be used to retrieve (at 704) the original copy. In some embodiments, security controller 200 renders the watermarked tree-based representation to identify the 3D object that is created by the nodes of the watermarked tree-based representation, and matches the 3D object to the 3D object that is stored in a stored copy of the retrieved (at 704) tree-based representation.

Process 700 includes comparing (at 706) the received (at 702) watermarked tree-based representation of the point cloud against the retrieved (at 704) original and unwatermarked tree-based representation of the same point cloud. Security controller 200 compares (at 706) the values stored for each node of the watermarked tree-based representation against the values stored for the corresponding node with the same node identifier in the original copy of the tree-based representation. Since the watermarked tree-based representation may have been edited or modified, security controller 200 selects the original nodes from the original copy of the tree-based representation, identifies the same node with the same node identifier in the watermarked tree-based representation, and compares the non-positional element values between the two nodes. Security controller 200 continues until all nodes or a majority of nodes of the original copy of the tree-based representation have been compared (at 706). In some embodiments, security controller 200 restricts the comparison (at 706) to a specific bit of a specific non-positional element that is selected for the watermark encoding.

Process 700 includes determining (at 708) a set of nodes in the watermarked tree-based representation that have one or more specific bits for one or more specific non-positional elements changed relative to the same bits for the same non-positional elements of the same set of nodes in the original copy of the tree-based representation based on the comparison (at 706). To simplify the detection of the watermark, security controller compares (at 706) the least significant bit of the RGB color elements to determine (at 708) the set of nodes that are encoded with the watermark when the watermark is statically encoded to the least significant bit of the RGB color elements. However, in some other embodiments, the watermark may be encoded in other bits of other non-positional elements.

Process 700 includes selecting (at 710) a particular watermark certificate that defines a watermark that is stored in nodes with the same identifiers as the determined (at 708) set of nodes. Security controller 200 stores multiple watermark certificates in conjunction with the original copy of the tree-based representation, wherein each watermark certificate defines a different watermark that is encoded to a different set of nodes in the tree-based representation.

In some embodiments, one or more nodes that are encoded with the watermark may be removed or modified from the watermarked tree-based representation. In some such embodiments, security controller 200 selects (at 710) the particular watermark certificate that has at least a threshold number of node identifiers in common with the determined (at 708) set of nodes (e.g., greater than 80%).

Process 700 includes verifying (at 712) the identity of the original recipient for the watermarked tree-based representation based on the client device identifier or user identifier that is stored in the particular watermark certificate. In this manner, security controller 200 is able to track the original recipient of the watermarked tree-based representation that intentionally or unintentionally distributed the watermarked tree-based representation to other entities without permission. Security controller 200 may notify the point cloud creator or take additional actions to remove the unauthorized use of the watermarked tree-based representation.

Figure 8:
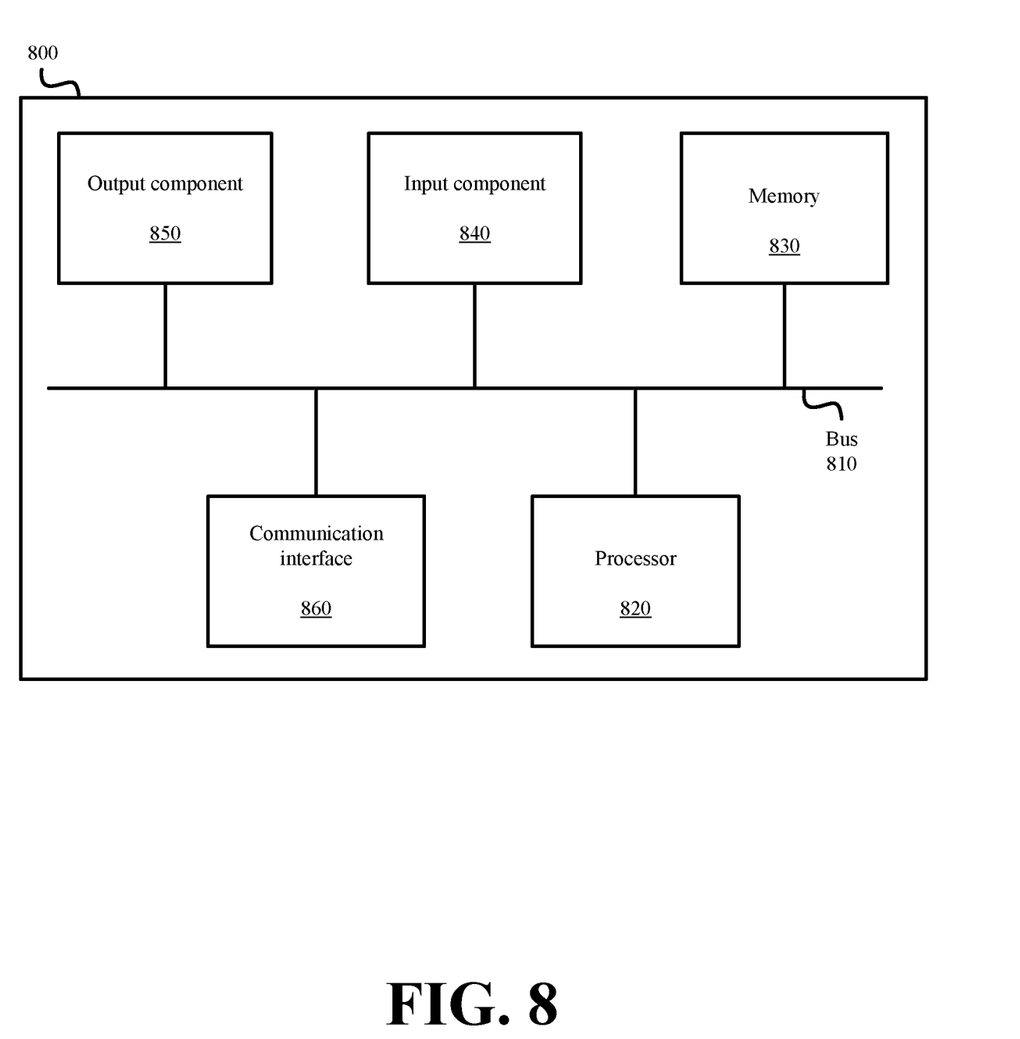
FIG. 8 illustrates example components of one or more devices, according to one or more embodiments described herein.

FIG. 8 is a diagram of example components of device 800. Device 800 may be used to implement one or more of the devices or systems described above (e.g., security controller 200, a point cloud publishing and/or distribution system, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a file comprising a plurality of data points that form a model of an object in a three-dimensional ("3D") space, each data point of the plurality of data points is defined with a set of positional elements and a set of non-positional elements, wherein the set of positional elements of a particular data point establish a position of the particular data point in the 3D space, and wherein the set of non-positional elements of the particular data point define visual characteristics of the particular data point in the 3D space;
    selecting a first set of data points from the plurality of data points in response to a first request from a first client to access the file;
    changing at least one specific bit of a set of bits that define a value for a particular non-positional element of the set of non-positional elements for each data point of the first set of data points;
    encoding the file with a first watermark that is unique to the first client based on said changing the at least one specific bit of the set of bits for the particular non-positional element of each data point in the first set of data points; and
    distributing the file encoded with the first watermark in response to the first request.

2. The method of claim 1 further comprising:
    selecting a second set of data points from the plurality of data points in response to a second request from a second client to access the file;
    encoding the file with a second watermark that is unique to the second client by changing the at least one specific bit of the set of bits for the particular non-positional element of each data point of the second set of data points; and
    distributing the file encoded with the second watermark in response to the second request.

3. The method of claim 1 further comprising:
    storing the file comprising the plurality of data points with original values for each non-positional element of the set of non-positional elements; and
    storing a watermark certificate comprising a first set of identifiers for the first set of data points and an identifier of the first client.

4. The method of claim 3 further comprising:
    storing a second set of identifiers for a second set of data points from the plurality of data points that encode a second watermark for a second client in a different watermarked instance of the file.

5. The method of claim 3 further comprising:
    receiving the file that is encoded with the first watermark;
    comparing the plurality of data points from the file that is encoded with the first watermark against the plurality of data points with the original values;
    detecting a difference in the at least one specific bit of the first set of data points; and
    verifying that the file that is encoded with the first watermark was originally distributed to the first client in response to the detecting the difference in the at least one specific bit of the first set of data points and the first set of data points being associated with the identifier of the first client in the watermark certificate.

6. The method of claim 5 further comprising:
    providing a notification that the file that is encoded with the first watermark was distributed to the first client in response to said verifying.

7. The method of claim 1, wherein the particular non-positional element defines a color value of a data point; and
    wherein changing the at least one specific bit comprises flipping a least significant bit of the set of bits that define the color value of the particular non-positional element.

8. The method of claim 1 further comprising:
    obtaining a tree-based representation of the plurality of data points; and
    wherein selecting the first set of data points comprises:
        selecting a first set of nodes from a plurality of nodes of the tree-based representation that are linked to the first set of data points; and
        storing a node identifier of each node from the first set of nodes in a watermark certificate that identifies an encoded location of the first watermark.

9. The method of claim 1, wherein selecting the first set of data points comprises:
    obtaining an identifier of the first client or a user associated with the first client; and modifying a selection of data points to encode with the first watermark based on the identifier of the first client or the user.

10. The method of claim 1 further comprising:
determining that the first client is requesting the file for a first time;
wherein selecting the first set of data points comprises:
selecting the first set of data points to be different than other sets of the plurality of data points that are selected to encode the file with watermarks for other clients.

11. The method of claim 1 further comprising:
associating each data point of the plurality of data points to a different node of a plurality of nodes that form a tree-based representation of the file; and
storing the tree-based representation of the file and a verification certificate for the first watermark that comprises a client identifier of the first client and a node identifier of each node from a set of nodes that are associated with the first set of data points.

12. The method of claim 11 further comprising:
verifying that the file encoded with the first watermark was distributed to the first client based on each node identifier in the verification certificate being associated with a data point in the file encoded with the first watermark that has a different value for the at least one specific bit of the particular non-positional element than a corresponding data point in an original copy of the file.

13. The method of claim 1, wherein encoding the file with the first watermark comprises:
adding the first watermark to the first set of data points without noticeably changing the visual characteristics of the plurality of data points.

14. The method of claim 1 further comprising:
tracking the distribution of the file encoded with the first watermark to the first client by tracking the first set of data points from the plurality of data points with the at least one specific bit of the particular non-positional element that was changed.

15. A system comprising:
one or more hardware processors configured to:
receive a file comprising a plurality of data points that form a model of an object in a three-dimensional ("3D") space, each data point of the plurality of data points is defined with a set of positional elements and a set of non-positional elements, wherein the set of positional elements of a particular data point establish a position of the particular data point in the 3D space, and wherein the set of non-positional elements of the particular data point define visual characteristics of the particular data point in the 3D space;
select a first set of data points from the plurality of data points in response to a first request from a first client to access the file;
change at least one specific bit of a set of bits that define a value for a particular non-positional element of the set of non-positional elements for each data point of the first set of data points;
encode the file with a first watermark that is unique to the first client based on said changing the at least one specific bit of the set of bits for the particular non-positional element of each data point in the first set of data points; and
distribute the file encoded with the first watermark in response to the first request.

16. The system of claim 15, wherein the one or more hardware processors are further configured to:
select a second set of data points from the plurality of data points in response to a second request from a second client to access the file;
encode the file with a second watermark that is unique to the second client by changing the at least one specific bit of the set of bits for the particular non-positional element of each data point of the second set of data points; and
distribute the file encoded with the second watermark in response to the second request.

17. The system of claim 15, wherein the one or more hardware processors are further configured to:
store the file comprising the plurality of data points with original values for each non-positional element of the set of non-positional elements; and
store a watermark certificate comprising a first set of identifiers for the first set of data points and an identifier of the first client.

18. The system of claim 17, wherein the one or more hardware processors are further configured to:
store a second set of identifiers for a second set of data points from the plurality of data points that encode a second watermark for a second client in a different watermarked instance of the file.

19. The system of claim 17, wherein the one or more hardware processors are further configured to:
receive the file that is encoded with the first watermark;
compare the plurality of data points from the file that is encoded with the first watermark against the plurality of data points with the original values;
detect a difference in the at least one specific bit of the first set of data points; and
verify that the file that is encoded with the first watermark was originally distributed to the first client in response to the detecting the difference in the at least one specific bit of the first set of data points and the first set of data points being associated with the identifier of the first client in the watermark certificate.

20. A non-transitory computer-readable medium storing program instructions that, when executed by one or more hardware processors of a content distribution system, cause the content distribution system to perform operations comprising:
receiving a file comprising a plurality of data points that form a model of an object in a three-dimensional ("3D") space, each data point of the plurality of data points is defined with a set of positional elements and a set of non-positional elements, wherein the set of positional elements of a particular data point establish a position of the particular data point in the 3D space, and wherein the set of non-positional elements of the particular data point define visual characteristics of the particular data point in the 3D space;
selecting a first set of data points from the plurality of data points in response to a first request from a first client to access the file;
changing at least one specific bit of a set of bits that define a value for a particular non-positional element of the set of non-positional elements for each data point of the first set of data points;
encoding the file with a first watermark that is unique to the first client based on said changing the at least one specific bit of the set of bits for the particular non-positional element of each data point in the first set of data points; and distributing the file encoded with the first watermark in response to the first request.

\* \* \* \* \*